US010719235B1

(12) United States Patent
Diaconescu et al.

(10) Patent No.: US 10,719,235 B1
(45) Date of Patent: Jul. 21, 2020

(54) MANAGING VOLUME PLACEMENT ON DISPARATE HARDWARE

(71) Applicant: Amazon Technologies, Inc., Reno, NV (US)

(72) Inventors: Dragos Diaconescu, Bellevue, WA (US); Mitchell Gannon Flaherty, Seattle, WA (US); Christopher Magee Greenwood, Seattle, WA (US); Gary Michael Herndon, Jr., Seattle, WA (US); James Michael Thompson, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 30 days.

(21) Appl. No.: 15/471,456

(22) Filed: Mar. 28, 2017

(51) Int. Cl.
*G06F 12/00* (2006.01)
*G06F 3/06* (2006.01)

(52) U.S. Cl.
CPC ............ *G06F 3/0608* (2013.01); *G06F 3/065* (2013.01); *G06F 3/0619* (2013.01); *G06F 3/0665* (2013.01)

(58) Field of Classification Search
None
See application file for complete search history.

(56) References Cited

U.S. PATENT DOCUMENTS

| | | | |
|---|---|---|---|
| 9,798,497 B1 * | 10/2017 | Schick | G06F 3/0664 |
| 2009/0228669 A1 * | 9/2009 | Slesarev | G06F 3/0605 711/161 |
| 2015/0355947 A1 * | 12/2015 | Polkovnikov | G06F 3/0631 718/104 |
| 2018/0048584 A1 * | 2/2018 | Ra | H04L 47/70 |

\* cited by examiner

*Primary Examiner* — Jason W Blust
(74) *Attorney, Agent, or Firm* — Hogan Lovells US LLP

(57) ABSTRACT

Placement decisions can be made for data storage volumes based at least in part upon the requirements of the storage volumes and the capabilities of the types of hardware available to host those volumes. There may be multiple types of hardware capable of supporting a volume, and the placement can be biased to hardware capable of supporting fewer types of storage volumes in order to ensure sufficient capacity for the various types of storage volumes. A consistent level of performance can also be provided independent of the type of hardware utilized. Hardware can be selected to host a volume that is able to satisfy various volume requirements, and the operation can be adjusted to ensure that the volume requirements are satisfied over time.

19 Claims, 8 Drawing Sheets

MANAGING VOLUME PLACEMENT ON DISPARATE HARDWARE

BACKGROUND

As an increasing number of applications and services are being made available over networks such as the Internet, an increasing number of content, application, and/or service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In some environments, multiple users can share resources such as remote servers and data repositories, wherein the users can concurrently send multiple requests to be executed against the same resource. Problems can arise, however, since there is a limited amount of capacity of each type of resource. Conventional systems address these problems by providing dedicated resources to users and/or purchasing additional capacity, but such approaches are expensive and often result in unused excess capacity. Further, each type of volume can be limited to placement on a specific type of resource, which can result in excess capacity in one type of resource while another type of resource might be at or over capacity.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to managing resource sharing and allocation in an electronic environment. In particular, placement decisions can be made for storage volumes based at least in part upon the performance requirements of the storage volumes and the performance capabilities of the types of hardware available to host the storage volumes. In some embodiments there may be multiple types of hardware capable of supporting a volume, and the placement can be at least somewhat biased to lower performing hardware in order to ensure sufficient capacity of higher performing hardware for the types of volumes that require that level of performance. Further, in some embodiments a consistent level of performance can be provided independent of the type of hardware utilized. Hardware can be selected to host a volume that is able to satisfy at least the minimum performance requirements, and throttling or other performance degrading approaches can be utilized as needed to ensure that the performance on a particular host or type of hardware does not exceed the anticipated performance range.

Various other such functions can be used as well within the scope of the various embodiments as would be apparent to one of ordinary skill in the art in light of the teachings and suggestions contained herein.

Figure 1:
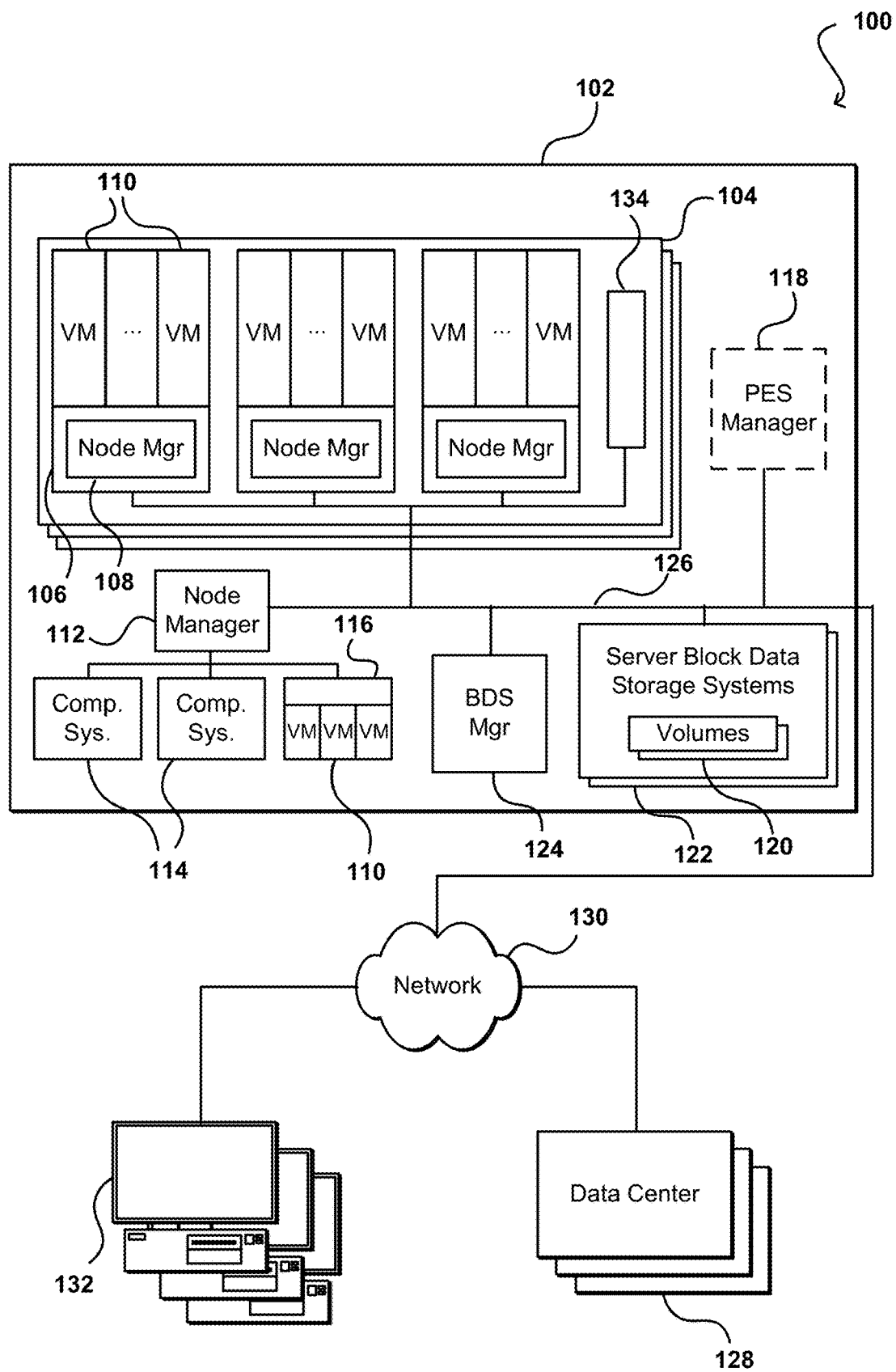
FIG. 1 illustrates an example environment in which various embodiments can be implemented.

FIG. 1 illustrates an example network configuration 100 in which multiple computing systems are operable to execute various programs, applications, and/or services, and further operable to access reliable non-local block data storage, such as under the control of a block data storage service and/or program execution service, in accordance with various embodiments. In particular, in this example, a program execution service manages the execution of programs on various host computing systems located within a data center 102, and a block data storage service uses multiple other server block data storage systems at the data center to provide reliable non-local block data storage to those executing programs. Multiple remote archival storage systems external to the data center may also be used to store additional copies of at least some portions of at least some block data storage volumes.

Systems and methods in accordance with various embodiments are operable to manage access to resources such as data storage and data servers. In at least some embodiments, these approaches include providing a block data storage service that uses multiple server storage systems to reliably store block data that may be accessed and used over one or more networks by any of various users, applications, processes, and/or services. Users of the block data storage service may each create one or more block data storage volumes that each have a specified amount of block data storage space, and may initiate use of such a block data storage volume (also referred to as a "volume" herein) by one or more executing programs, with at least some such volumes having copies stored by two or more of the multiple server storage systems so as to enhance volume reliability and availability to the executing programs. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a volume stored on a server block data storage system in a data center may execute on one or more other physical computing systems at that data center.

In addition, in at least some embodiments, applications that access and use one or more such non-local block data storage volumes over one or more networks may each have an associated node manager that manages the access to those non-local volumes by the program, such as a node manager module that is provided by the block data storage service and/or that operates in conjunction with one or more block data service manager modules. For example, a first user who is a customer of the block data storage service may create a first block data storage volume, and execute one or more program copies on one or more resource nodes that are instructed to access and use the first volume (e.g., in a serial manner, in a simultaneous or other overlapping manner, etc.). When an application executing on a resource node initiates use of a non-local volume, the application may mount or otherwise be provided with a logical block data storage device that is local to the resource node and that represents the non-local volume, such as to allow the executing program to interact with the local logical block data storage device in the same manner as any other local hard drive or other physical block data storage device that is attached to the resource node (e.g., to perform read and write data access requests, to implement a file system or database or other higher-level data structure on the volume, etc.). For example, in at least some embodiments, a representative logical local block data storage device may be made available to an executing program via use of an appropriate technology, such as GNBD ("Global Network Block Device") technology. In addition, when an application interacts with the representative local logical block data storage device, the associated node manager may manage those interactions by communicating over one or more networks with at least one of the server block data storage systems that stores a copy of the associated non-local volume (e.g., in a manner transparent to the executing program and/or resource node) so as to perform the interactions on that stored volume copy on behalf of the executing program. Furthermore, in at least some embodiments, at least some of the described techniques for managing access of applications and services to non-local block data storage volumes are automatically performed by embodiments of a Node manager module.

In at least some embodiments, block data storage volumes (or portions of those volumes) may further be stored on one or more remote archival storage systems that are distinct from the server block data storage systems used to store volume copies. In various embodiments, the one or more remote archival storage systems may be provided by the block data storage service (e.g., at a location remote from a data center or other geographical location that has a pool of co-located server block data storage systems), or instead may be provided by a remote long-term storage service and used by the block data storage, and in at least some embodiments the archival storage system may store data in a format other than block data (e.g., may store one or more chunks or portions of a volume as distinct objects).

In some embodiments, at least some of the described techniques are performed on behalf of a program execution service that manages execution of multiple programs on behalf of multiple users of the program execution service. In some embodiments, the program execution service may have groups of multiple co-located physical host computing systems, and may execute users' programs on those physical host computing systems, such as under control of a program execution service system manager, as discussed in greater detail below. In such embodiments, users of the program execution service (e.g., customers of the program execution service who pay fees to use the program execution service) who are also users of the block data storage service may execute programs that access and use non-local block data storage volumes provided via the block data storage service. In other embodiments, a single organization may provide at least some of both program execution service capabilities and block data storage service capabilities (e.g., in an integrated manner, such as part of a single service), while in yet other embodiments the block data storage service may be provided in environments that do not include a program execution service (e.g., internally to a business or other organization to support operations of the organization).

In addition, the host computing systems on which programs execute may have various forms in various embodiments. Multiple such host computing systems may, for example, be co-located in a physical location (e.g., a data center), and may be managed by multiple node manager modules that are each associated with a subset of one or more of the host computing systems. At least some of the host computing systems may each include sufficient computing resources (e.g., volatile memory, CPU cycles or other CPU usage measure, network bandwidth, swap space, etc.) to execute multiple programs simultaneously, and, in at least some embodiments, some or all of the computing systems may each have one or more physically attached local block data storage devices (e.g., hard disks, tape drives, etc.) that can be used to store local copies of programs to be executed and/or data used by such programs. Furthermore, at least some of the host computing systems in some such embodiments may each host multiple virtual machine resource nodes that each may execute one or more programs on behalf of a distinct user, with each such host computing system having an executing hypervisor or other virtual machine monitor that manages the virtual machines for that host computing system. For host computing systems that execute multiple virtual machines, the associated node manager module for the host computing system may in some embodiments execute on at least one of multiple hosted virtual machines (e.g., as part of or in conjunction with the virtual machine monitor for the host computing system), while in other situations a node manager may execute on a physical computing system distinct from one or more other host computing systems being managed.

The server block data storage systems on which volumes are stored may also have various forms in various embodiments. In at least some embodiments, some or all of the server block data storage systems may be physical computing systems similar to the host computing systems that execute programs, and in some such embodiments may each execute server storage system software to assist in the provision and maintenance of volumes on those server storage systems. For example, in at least some embodiments, one or more of such server block data storage computing systems may execute at least part of the block data storage (BDS) manager, such as if one or more manager modules are provided in a distributed peer-to-peer manner by multiple interacting server block data storage computing systems. In other embodiments, at least some of the server block data storage systems may be network storage devices that may lack some I/O components and/or other components of physical computing systems, such as if at least some of the provision and maintenance of volumes on those server storage systems is performed by other remote physical computing systems (e.g., by a block data storage manager module executing on one or more other computing systems). In addition, in some embodiments, at least some server block data storage systems each maintains multiple local hard disks, and stripes at least some volumes across a portion of each of some or all of the local hard disks. Furthermore, various types of techniques for creating and using volumes may be used, including in some embodiments to use LVM ("Logical Volume Manager") technology.

In at least some embodiments, some or all block data storage volumes each have copies stored on two or more distinct server block data storage systems, such as to enhance reliability and availability of the volumes. By doing so, failure of a single server block data storage system may not cause access of executing programs to a volume to be lost, as use of that volume by those executing programs may be switched to another available server block data storage system that has a copy of that volume. In such embodiments, consistency may be maintained between the multiple copies of a volume on the multiple server block data storage systems in various ways. For example, in some embodiments, one of the server block data storage systems is designated as storing the primary copy of the volume, and the other one or more server block data storage systems are designated as storing mirror copies of the volume in such embodiments, the server block data storage system that has the primary volume copy (referred to as the "primary server block data storage system" for the volume) may receive and handle data access requests for the volume, and in some such embodiments may further take action to maintain the consistency of the other mirror volume copies (e.g., by sending update messages to the other server block data storage systems that provide the mirror volume copies when data in the primary volume copy is modified, such as in a master-slave computing relationship manner). Various types of volume consistency techniques may be used, with additional details included below.

In addition to maintaining reliable and available access of executing programs to block data storage volumes by moving or otherwise replicating volume copies when server block data storage systems become unavailable, the block data storage service may perform other actions in other situations to maintain access of executing programs to block data storage volumes. For example, if a first executing program unexpectedly becomes unavailable, in some embodiments the block data storage service and/or program execution service may take actions to have a different second executing program (e.g., a second copy of the same program that is executing on a different host computing system) attach to some or all block data storage volumes that were in use by the unavailable first program, so that the second program can quickly take over at least some operations of the unavailable first program. The second program may in some situations be a new program whose execution is initiated by the unavailability of the existing first program, while in other situations the second program may already be executing (e.g., if multiple program copies are concurrently executed to share an overall load of work, such as multiple Web server programs that receive different incoming client requests as mediated by a load balancer, with one of the multiple program copies being selected to be the second program; if the second program is a standby copy of the program that is executing to allow a "hot" swap from the existing first program in the event of unavailability, such as without the standby program copy being actively used until the unavailability of the existing first program occurs; etc.). In addition, in some embodiments, a second program to which an existing volume's attachment and ongoing use is switched may be on another host physical computing system in the same geographical location (e.g., the same data center) as the first program, while in other embodiments the second program may be at a different geographical location (e.g., a different data center, such as in conjunction with a copy of the volume that was previously or concurrently moved to that other data center and will be used by that second program). Furthermore, in some embodiments, other related actions may be taken to further facilitate the switch to the second program, such as by redirecting some communications intended for the unavailable first program to the second program.

As previously noted, in at least some embodiments, some or all block data storage volumes each have copies stored on two or more distinct server block data storage systems at a single geographical location, such as within the same data center in which executing programs will access the volume by locating all of the volume copies and executing programs at the same data center or other geographical location, various desired data access characteristics may be maintained (e.g., based on one or more internal networks at that data center or other geographical location), such as latency and throughput. For example, in at least some embodiments, the described techniques may provide access to non-local block data storage that has access characteristics that are similar to or better than access characteristics of local physical block data storage devices, but with much greater reliability that is similar to or exceeds reliability characteristics of RAID ("Redundant Array of Independent (or Inexpensive) Disks") systems and/or dedicated SANs ("Storage Area Networks") and at much lower cost. In other embodiments, the primary and mirror copies for at least some volumes may instead be stored in other manners, such as at different geographical locations (e.g., different data centers), such as to further maintain availability of a volume even if an entire data center becomes unavailable. In embodiments in which volume copies may be stored at different geographical locations, a user may in some situations request that a particular program be executed proximate to a particular volume (e.g., at the same data center at which the primary volume copy is located), or that a particular volume be located proximate to a particular executing program, such as to provide relatively high network bandwidth and low latency for communications between the executing program and primary volume copy.

Furthermore, access to some or all of the described techniques may in some embodiments be provided in a fee-based or other paid manner to at least some users. For example, users may pay one-time fees, periodic (e.g., monthly) fees and/or one or more types of usage-based fees to use the block data storage service to store and access volumes, to use the program execution service to execute programs, and/or to use archival storage systems (e.g., provided by a remote long-term storage service) to store long-term backups or other snapshot copies of volumes. Fees may be based on one or more factors and activities, such as indicated in the following non-exclusive list: based on the size of a volume, such as to create the volume (e.g., as a one-time fee), to have ongoing storage and/or use of the volume (e.g., a monthly fee), etc.; based on non-size characteristics of a volume, such as a number of mirror copies, characteristics of server block data storage systems (e.g., data access rates, storage sizes, etc.) on which the primary and/or mirror volume copies are stored, and/or a manner in which the volume is created (e.g., a new volume that is empty, a new volume that is a copy of an existing volume, a new volume that is a copy of a snapshot volume copy, etc.); based on the size of a snapshot volume copy, such as to create the snapshot volume copy (e.g., as a one-time fee) and/or have ongoing storage of the volume (e.g., a monthly fee); based on the non-size characteristics of one or more snapshot volume copies, such as a number of snapshots of a single volume, whether a snapshot copy is incremental with respect to one or more prior snapshot copies, etc.; based on usage of a volume, such as the amount of data transferred to and/or from a volume (e.g., to reflect an amount of network bandwidth used), a number of data access requests sent to a volume, a number of executing programs that attach to and use a volume (whether sequentially or concurrently), etc.; based on the amount of data transferred to and/or from a snapshot, such as in a manner similar to that for volumes; etc. In addition, the provided access may have various forms in various embodiments, such as a onetime purchase fee, an ongoing rental fee, and/or based on another ongoing subscription basis. Furthermore, in at least some embodiments and situations, a first group of one or more users may provide data to other users on a fee-based basis, such as to charge the other users for receiving access to current volumes and/or historical snapshot volume copies created by one or more users of the first group (e.g., by allowing them to make new volumes that are copies of volumes and/or of snapshot volume copies; by allowing them to use one or more created volumes; etc.), whether as a one-time purchase fee, an ongoing rental fee, or on another ongoing subscription basis.

In some embodiments, one or more application programming interfaces (APIs) may be provided by the block data storage service, program execution service and/or remote long-term storage service, such as to allow other programs to programmatically initiate various types of operations to be performed (e.g., as directed by users of the other programs). Such operations may allow some or all of the previously described types of functionality to be invoked, and include, but are not limited to, the following types of operations: to create, delete, attach, detach, or describe volumes; to create, delete, copy or describe snapshots; to specify access rights or other metadata for volumes and/or snapshots; to manage execution of programs; to provide payment to obtain other types of functionality; to obtain reports and other information about use of capabilities of one or more of the services and/or about fees paid or owed for such use; etc. The operations provided by the API may be invoked by, for example, executing programs on host computing systems of the program execution service and/or by computing systems of customers or other users that are external to the one or more geographical locations used by the In the example of FIG. 1, a shared resource environment 102, such as may comprise a data center or service provider environment, includes a number of racks 104, each rack including a number of host computing devices 106, as well as an optional rack support computing system 134 in this example embodiment. The host computing systems 106 on the illustrated rack 104 each host one or more virtual machines 110 in this example, as well as a distinct Node manager module 108 associated with the virtual machines on that host computing system to manage those virtual machines. One or more other host computing systems 116 may also each host one or more virtual machines 110 in this example. Each virtual machine 110 may act as an independent resource node for executing one or more program copies (not shown) for a user (not shown), such as a customer of the program execution service, or performing another such action or process or user data requests, I/O operations, etc. In addition, this example data center 102 further includes additional host computing systems 114 that do not include distinct virtual machines, but may nonetheless each act as a resource node for one or more programs (not shown) being executed for a user. In this example, a Node manager module 112 executing on a computing system (not shown) distinct from the host computing systems 114 and 116 is associated with those host computing systems to manage the resource nodes provided by those host computing systems, such as in a manner similar to the Node manager modules 108 for the host computing systems 106. The rack support computing system 134 may provide various utility services for other computing systems local to its rack 102 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

In this example, an optional computing system 118 is also illustrated that executes a program execution service (PES) manager module for the program execution service to assist in managing the execution of programs on the resource nodes provided by the host computing systems located within the data center (or optionally on computing systems located in one or more other data centers 128, or other remote computing systems 132 external to the data center). As discussed in greater detail elsewhere, a PES manager module may provide a variety of services in addition to managing execution of programs, including the management of user accounts (e.g., creation, deletion, billing, etc.); the registration, storage, and distribution of programs to be executed; the collection and processing of performance and auditing data related to the execution of programs; the obtaining of payment from customers or other users for the execution of programs; etc. In some embodiments, the PES manager module may coordinate with the node manager modules 108 and 112 to manage program execution on resource nodes associated with the node manager modules, while in other embodiments the node manager modules may not assist in managing such execution of programs.

This example the data center 102 also includes a computing system 124 that executes a block data storage ("BDS") system manager module for the block data storage service to assist in managing the availability of non-local block data storage to programs executing on resource nodes provided by the host computing systems located within the data center (or optionally on computing systems located in one or more other data centers 128, or other remote computing systems 132 external to the data center). In particular, in this example, the data center 102 includes a pool of multiple server block data storage systems 122, which each have local block storage for use in storing one or more volume copies 120. Access to the volume copies 120 is provided over the internal network(s) 126 to programs executing on various resource nodes 110 and 114. As discussed in greater detail elsewhere, a BDS manager module may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS manager module may coordinate with the Node manager modules to manage use of volumes by programs executing on associated resource nodes, while in other embodiments the Node manager modules may not be used to manage such volume use. In addition, in other embodiments, one or more BDS manager modules may be structured in other manners, such as to have multiple instances of the BDS manager executing in a single data center (e.g., to share the management of non-local block data storage by programs executing on the resource nodes provided by the host computing systems located within the data center), and/or such as to have at least some of the functionality of a BDS manager module being provided in a distributed manner by software executing on some or all of the server block data storage systems 122 (e.g., in a peer to-peer manner, without any separate centralized BDS manager module on a computing system 124).

In this example, the various host computing systems, server block data storage systems, and computing systems are interconnected via one or more internal networks 126 of the data center, which may include various networking devices (e.g., routers, switches, gateways, etc.) that are not shown. In addition, the internal networks 126 are connected to an external network 130 (e.g., the Internet or other public network) in this example, and the data center 102 may further include one or more optional devices (not shown) at the interconnect between the data center and an external network (e.g., network proxies, load balancers, network address translation devices, etc.). In this example, the data center 102 is connected via the external network 130 to one or more other data centers 128 that each may include some or all of the computing systems and storage systems illustrated with respect to data center 102, as well as other remote computing systems 132 external to the data center. The other computing systems 132 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 122 may further be interconnected with one or more other networks or other connection mediums, such as a high-bandwidth connection over which the server storage systems 122 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 1 has been simplified for the purposes of explanation, and that the number and organization of host computing systems, server block data storage systems and other devices may be much larger than what is depicted in FIG. 1. For example, as one illustrative embodiment, there may be approximately 4,000 computing systems per data center, with at least some of those computing systems being host computing systems that may each host fifteen virtual machines, and/or with some of those computing systems being server block data storage systems that may each store several volume copies. If each hosted virtual machine executes one program, then such a data center may execute as many as sixty thousand program copies at one time. Furthermore, hundreds or thousands (or more) volumes may be stored on the server block data storage systems, depending on the number of server storage systems, size of the volumes, and number of mirror copies per volume. It will be appreciated that in other embodiments, other numbers of computing systems, programs and volumes may be used.

Figure 2:
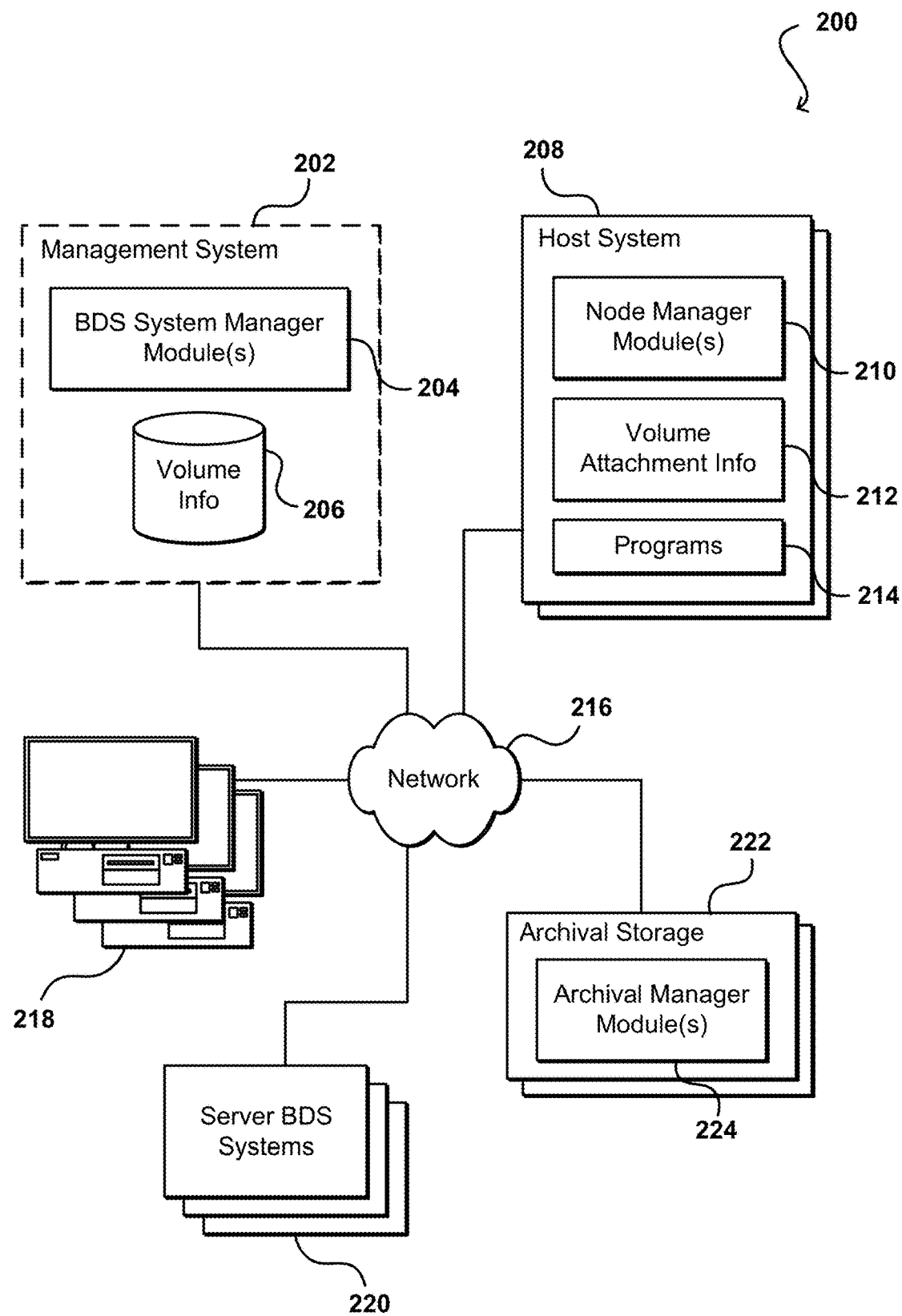
FIG. 2 illustrates an example separation of management and host components that can be used in accordance with various embodiments.

FIG. 2 illustrates an example environment 200 including computing systems suitable for managing the provision and use of reliable non-local block data storage functionality to clients that can be used in accordance with various embodiments. In this example, a management system 202, such as one or more server computers including one or more externally-facing customer interfaces, is programmed to execute an embodiment of at least one BDS manager module 204 to manage provisioning of non-local block data storage functionality to programs executing on host computing systems 208 and/or on at least some other computing systems 218, such as to block data storage volumes (not shown) provided by the server block data storage systems 220. Each of the host computing systems 208 in this example also executes an embodiment of a node manager module 210 to manage access of programs 214 executing on the host computing system to at least some of the non-local block data storage volumes, such as in a coordinated manner with the BDS manager module 204 over a network 216 (e.g., an internal network of a data center, not shown, that includes the computing systems 202, 208, 220, and optionally at least some of the other computing systems 218). In other embodiments, some or all of the Node manager modules 210 may instead manage one or more other computing systems (e.g., the other computing systems 218).

In addition, multiple server block data storage systems 220 are illustrated that each can store at least some of the non-local block data storage volumes (not shown) used by the executing programs 214, with access to those volumes also provided over the network 216 in this example. One or more of the server block data storage systems 220 may also each store a server software component (not shown) that manages operation of one or more of the server block data storage systems, as well as various information (not shown) about the data that is stored by the server block data storage systems. Thus, in at least some embodiments, the server computing system 202 of FIG. 2 may correspond to the computing system 124 of FIG. 1, one or more of the node manager modules 108 and 112 of FIG. 1 may correspond to the node manager modules 210 of FIG. 2, and/or one or more of the server block data storage computing systems 220 of FIG. 2 may correspond to server block data storage systems 122 of FIG. 1. In addition, in this example embodiment, multiple archival storage systems 222 are illustrated, which may store snapshot copies and/or other copies of at least portions of at least some block data storage volumes stored on the server block data storage systems 220. The archival storage systems 222 may also interact with some or all of the computing systems 202, 208, and 220, and in some embodiments may be remote archival storage systems (e.g., of a remote storage service, not shown) that interact with the computing systems over one or more other external networks (not shown).

The other computing systems 218 may further include other proximate or remote computing systems of various types in at least some embodiments, including computing systems via which customers or other users of the block data storage service interact with the management and/or host systems. Furthermore, one or more of the other computing systems 218 may further execute a PES System Manager module to coordinate execution of programs on the host computing systems 208 and/or other host computing systems 218, or the management system 202 or one of the other illustrated computing systems may instead execute such a PES System Manager module, although a PES System Manager module is not illustrated in this example.

In the illustrated embodiment, a node manager module 210 is executing in memory in order to manage one or more other programs 214 executing in memory on the computing system, such as on behalf of customers of the program execution service and/or block data storage service. In some embodiments, some or all of the computing systems 208 may host multiple virtual machines, and if so, each of the executing programs 214 may be an entire virtual machine image (e.g., with an operating system and one or more application programs) executing on a distinct hosted virtual machine resource node. The node manager module 210 may similarly be executing on another hosted virtual machine, such as a privileged virtual machine monitor that manages the other hosted virtual machines. In other embodiments, the executing program copies 214 and the Node manager module 210 may execute as distinct processes on a single operating system (not shown) executed on a single computing system 208.

The archival storage system 222 is operable to execute at least one archival manager module 224 in order to manage operation of one or more of the archival storage systems, such as on behalf of customers of the block data storage service and/or of a distinct storage service that provides the archival storage systems. In other embodiments, the archival manager module(s) 224 may instead be executing on another computing system, such as one of the other computing systems 218 or on the management system 202 in conjunction with the BDS manager module 204. In addition, while not illustrated here, in some embodiments various information about the data that is stored by the archival storage systems 222 may be maintained in storage for the archival storage systems or elsewhere.

The BDS manager module 204 and node manager modules 210 may take various actions to manage the provisioning and/or use of reliable non-local block data storage functionality to clients (e.g., executing programs), as described in greater detail elsewhere. In this example, the BDS manager module 204 may maintain a database 206 that includes information about volumes stored on the server block data storage systems 220 and/or on the archival storage systems 222 (e.g., for use in managing the volumes), and may further store various other information (not shown) about users or other aspects of the block data storage service. In other embodiments, information about volumes may be stored in other manners, such as in a distributed manner by node manager modules 210 on their computing systems and/or by other computing systems. In addition, in this example, each node manager module 210 on a host computing system 208 may store information 212 about the current volumes attached to the host computing system and used by the executing programs 214 on the host computing system, such as to coordinate interactions with the server block data storage systems 220 that provide the primary copies of the volumes, and to determine how to switch to a mirror copy of a volume if the primary volume copy becomes unavailable. While not illustrated here, each host computing system may further include a distinct logical local block data storage device interface for each volume attached to the host computing system and used by a program executing on the computing system, which may further appear to the executing programs as being indistinguishable from one or more other local physically attached storage devices that provide local storage.

An environment such as that illustrated with respect to FIGS. 1-2 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 2, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount allows them to specify the amount of storage to be allocated, such as a value between 1 GB and 1 TB, in 1 GB increments. Components of the control plane, such as a BDS manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can perform various functionality, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume may not be able to select or request a particular type of volume, or a particular level of performance. A customer may be granted an amount of storage, and the performance can follow a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

A performance execution service or similar system can enable customers to obtain a minimum level of performance as specified by one or more service-level agreements (SLAs) provided for the service. In some embodiments a customer can purchase or obtain a specific type of storage offering, such as a type of storage volume, which can come with an associated SLA. For example, a standard volume might be offered at a first level that is supported by magnetic storage and offers a minimum performance guarantee, such as at least 10,000 input/output operations per second (IOPS) at up to a maximum workload with a maximum amount of latency. A higher performance volume might be offered at a second level that is supported by solid state device (SSD) storage and offers a higher minimum performance guarantee, such as at least 40,000 IOPS at up to a maximum workload with a maximum amount of latency. Other aspects may vary as well, as the latency for an SSD-based storage volume may be much less than for a magnetic storage (i.e., disk or tape storage) based volume, among other such aspects.

In some embodiments a block-based storage service (or other storage system or service) may offer a suite of storage products, as may include multiple types of storage volumes, each with different performance characteristics and/or guarantees. Due to the different performance guarantees, different types of hardware may be used to support different types of volumes. For example, magnetic storage might be used to support a lowest level of storage volume, while SSD-based storage might be used to support a middle level of storage volume and a highest level of storage volume that offers the highest level performance guarantees. Different levels of service and types of storage can be utilized as well within the scope of the various embodiments. The mapping between volume types and the hosts on which those volume types could be placed can be straightforward in such an embodiment, as it can be based strictly on the underlying type of hardware.

Such an approach is not optimal in all situations, however, as the strict requirement for certain types of hardware to support certain types of storage volumes can result in some types of hardware being underutilized while other types of hardware might operate at, near, or even over capacity based on varying workloads. While higher performing hardware such as SSD can support higher levels of service, that hardware can also support lower levels of service, as might otherwise be supported by magnetic hardware. Thus, it can be advantageous in at least some embodiments to enable lower performance volumes to be placed on higher performance hardware based at least in part upon available capacity. Such an approach results in more expensive hardware supporting lower cost volumes, however, such that its utilization should be limited so as to not result in the loss of capacity to support higher performance volumes, or result in the stranding of available capacity. Further, customers with lower performance volumes could benefit from some of their volumes being placed on higher performing hardware, at least at particular times, but the varying in performance might lead to confusion or dissatisfaction at the unpredictability or variance in performance. As hardware becomes more flexible, the ability to support different types of volumes with different hardware will increase, but the level of performance for those volumes can then increasingly vary as well.

Accordingly, approaches in accordance with various embodiments can attempt to place storage on different types of hardware to balance capacity, and can attempt to adjust the way in which those volumes are supported in order to provide a more uniform performance and customer experience. In some embodiments, lower performance hardware will be selected for placement of lower performance volumes at least until a maximum amount of allocatable capacity is reached, after which the lower performance volumes can be placed on higher performance hardware. As discussed elsewhere herein, the lower performance volumes can be moved to lower performance hardware once the capacity becomes available. Biasing the placement of lower performance volumes to lower performance hardware can enable the maximum number of volume types to be supported by a given distribution of capacity, while preventing the undesirable stranding of capacity. Approaches discussed herein also can attempt to calculate a realistic capacity for each type of storage in order to further make placement decisions based on relative growth rates and workload variations for the different types of storage volumes.

Some embodiments can also allow for the setting and adjustment of the types of volumes that can be placed on certain types of hardware. In some embodiments the placement can be determined dynamically at the server or host level based on a variety of different criteria, such as recent server health, server performance characteristics, and the like. The dynamic adjustments of which products or types of volumes can be supported on a host can help guide the dynamic placement decisions such that certain types of volumes may not be placed on a host even if the capacity is available. For example, if a server is having issues with latency or throughput then the server might be limited to supporting lower performance volumes, while a server that is operating with peak performance might be limited to supporting only the highest performance or priority volumes, etc. Constraints on the types of products supported can also help to more accurately predict the amount of remaining capacity or satisfiable demand for each level of performance across the shared resource environment. Constraints can also be set and adjusted at other locations in the system as well. For example, placement decisions can be limited based on a maximum amount of fragmentation for various types of storage. While it might be optimal from a capacity standpoint to place storage volumes based on currently available storage capacity, there can be a performance hit (along with other undesirable results) for excessive fragmentation of customer data. For example, while it might be advantageous from a capacity standpoint to store data for a customer across twenty different servers of three different hardware types, there can be performance advantages to having all the data stored on a single hardware device, not including redundant copies, etc. Thus, placement decisions can attempt to balance fragmentation with capacity and other factors discussed herein. Further, the performance impact of fragmentation can be considered in the performance balancing discussed herein.

In many instances, a customer will be able to purchase or otherwise obtain a type of storage that is sufficient for their needs. For example, customers may wish to specify a minimum processing rate, such as a minimum rate of I/O operations. Approaches in accordance with various embodiments can commit the desired amount of server, storage, and/or other resources necessary to provide at least a committed level of performance. By committing to a level of performance, a customer can receive a consistent quality of service level that is not affected by the performance of other customers sharing a device or resource. Even in an overload situation, the customer can receive at least the guaranteed level of service. The amount of guaranteed service can depend upon various factors, as well as the amount specified and paid for by the customer.

Figure 3:
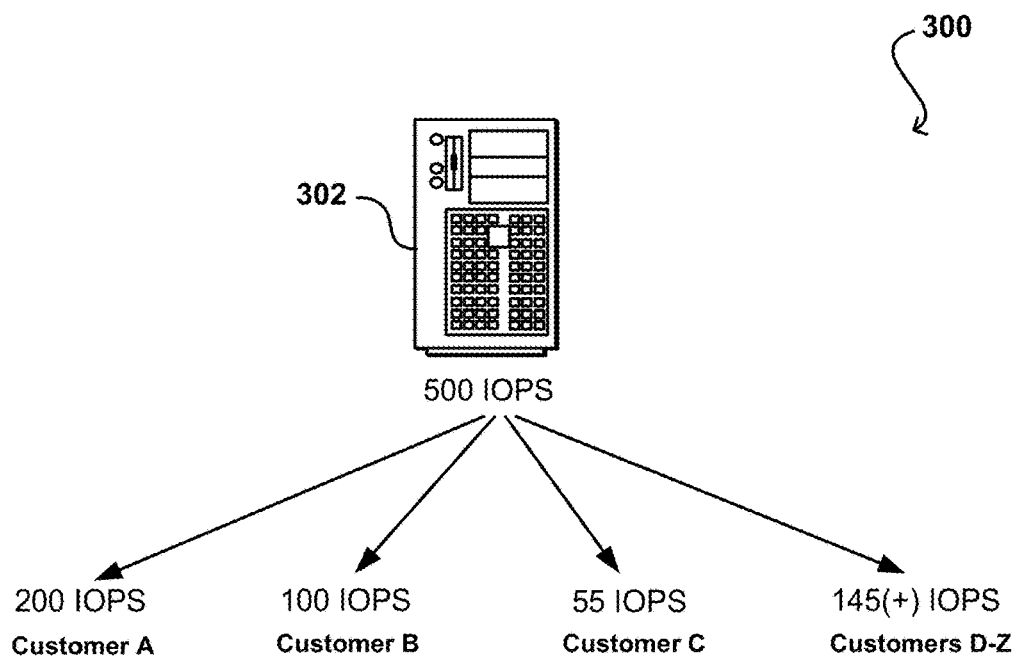
FIG. 3 illustrates an example allocation for multiple customers that can be used in accordance with various embodiments.

For example, FIG. 3 illustrates an example distribution 300 wherein the processing capacity of a server 302 is allocated among several customers. In this example, the server is determined to have a capacity for about 500 IOPS. This value can be an estimated or average value, and can be determined or adjusted over time based on monitored performance or other such information. While all 500 IOPS can be allocated in some embodiments, it can be desirable in other embodiments to only allocate a threshold amount, percentage, or other portion of the total capacity as guarantees. Since the processing time for each request can vary, the number of IOPS at any given time can vary as well, such that allocating all 500 IOPS might cause short periods of time where the customers are unable to receive their guarantees when the actual performance is on the order of 450 IOPS due to the nature of the requests being processed, etc.

In this example, the system might be able to allocate, for specific customers over time, up to 400 of the 500 IOPS available for the server 302. As can be seen, Customer A has been allocated a committed 200 IOPS, Customer B has been allocated a committed 100 IOPS, and Customer C has been allocated a committed 55 IOPS. The remaining customers on the server then can utilize a "best performance" or similar approach sharing the remaining 145 IOPS (on average). The number of customers sharing the remaining IOPS can be selected or limited based upon a number of factors, such that the remaining customers can still obtain a desirable level of performance a large percentage of the time.

In many cases, however, Customers A, B, and C will not all utilize their entire committed capacity. Each of those customers might pay to guarantee a level of performance such that the level is available when needed, but often will not actually be running near that peak capacity. In this situation, the remaining Customers D-Z can actually share more than the remaining 145 IOPS, or "remnants," as those customers can utilize available capacity from the committed IOPS that are not being currently used. This provides another advantage, as customers can receive guaranteed levels of performance, but when those levels are not being fully utilized the remaining capacity can be used to service other customer requests. Such an approach enables the regular customers (without guarantees) to receive improved performance, without the need for the provider to purchase excess capacity or provide capacity that is not being utilized a vast majority of the time.

In some embodiments, any of Customers A-C can exceed their performance guarantees. For example, Customer A might, for a period of time, submit requests on the order of 250 IOPS. For the 50 IOPS above the committed rate, those requests in some embodiments can be treated as normal requests and processed at the same performance level as those of customers D-Z. In an overload situation, any throttling, slow down, or other reduction in processing can then be applied to the 145 or so IOPS that are not subject to guarantees. The guaranteed levels for Customers A, B, and C will not be affected, as the overflow adjustments are made to the non-committed portion. Accordingly, customers with non-guaranteed levels of service can be charged lower prices per request, period, etc.

In other embodiments, when any of Customers A-C exceed its performance guarantees, that customer can receive a "blended" or other level of service. In a situation where each request for a customer is treated individually or without context, such that any single request over a committed rate can be treated as a request without a committed rate, there can be a negative impact on the other requests for that customer. For example, if Customer A has a committed rate of 250 IOPS and at one point issues 251 requests in a second, that single request over the rate commitment can be processed much more slowly than the other requests, such as at 20 ms instead of 1 ms. If the customer application is expecting a performance level of about 1 ms and experiences a slowdown with respect to one request, that can have an impact on the fulfilling of the other requests as well, and can cause a significant slowdown or other problems for the application even though the customer only slightly exceeded the threshold for a short period of time.

A PES manager can address such a situation by providing a "boost" or blended rate to customers with rate guarantees who exceed those guarantees, which provides a level of service between a committed and uncommitted rate. For example, a customer with a rate guarantee might have any excess requests placed at or near the front of the "queue" for uncommitted requests. In other embodiments, the customer might receive a lower rate commitment for those requests, such as might experience a delay of about 5 ms, which are not processed at the same rate as requests within the committed rate, but are processed more quickly than for customers without a committed rate. The amount of delay can be related in some embodiments to the amount of overage and the length of time that the customer is over the guaranteed rate, to provide a relatively uniform degradation in performance that is at least somewhat proportional to the amount of overage. For example, a customer with a guaranteed rate of 100 IOPS who is consistently sending requests at a rate of 500 per second would likely not receive as much of a boost as a customer with a 250 IOPS guaranteed rate who occasionally goes over by a handful of requests. In some embodiments, a customer can be provided with the same rate for any overage, but can be charged a premium for each such request. Many other variations are possible as well within the scope of the various embodiments.

To manage the commitments, components of a control plane can essentially make reservations against specific servers or other resources in the data plane. In FIG. 3 where three customers want a total of 355 IOPS committed, the control plane can reserve that level against a single server, for example, and allocate the remainder to any other customer provisioned on that server. The control plane can also ensure that more volumes are not allocated to a server than the server can handle, due to space limitations, the number of I/Os that need to be generated, or any other such factor.

In some cases, a customer might want a guaranteed level of service that exceeds the "committable" capacity for a given resource. For example, in FIG. 3 it was stated that the server could allocate 400 IOPS, but 355 are already allocated to Customers A-C. If another customer wants 300 IOPS, that number would exceed the allowed amount (as well as the average capacity) of the server. Thus, the customer cannot receive the desired commitment on that server. Using the management components of the control plane, however, the commitment rate can be allocated across multiple servers. For example, in the allocation 400 of FIG. 4, it is shown that Customer A sends a request from a user device 402 requesting a guarantee of 300 IOPS. The control plane in some embodiments can search the available servers to determine if a server is available with 300 IOPS left for guarantees. If not, the control plane can attempt to spread the IOPS across as few servers as possible. In this case, the control plane determines to allocate the IOPS guarantee across three servers, with a first server 404 providing a guarantee of 100 IOPS, a second server 406 providing a guarantee of 125 IOPS, and a third server 408 providing a guarantee of 75 IOPS. Thus, a volume does not need to be resident on a single server as in many conventional systems, but can be partitioned across multiple servers. The allocation across multiple servers also enables customers to utilize larger data volumes, such as volumes of 50 terabytes instead of 1 terabyte, as the data can be spread across multiple servers. In such an embodiment, a customer can purchase between 1 GB and 50 TB of storage, for example, with a desired commitment rate, such as a rate between 0 IOPS and 5,000 IOPS. Based on one or more of these values selected by a customer, the control plane can determine an appropriate, if not optimal, way to provide those guarantees using available resources in the data plane.

Figure 5A:
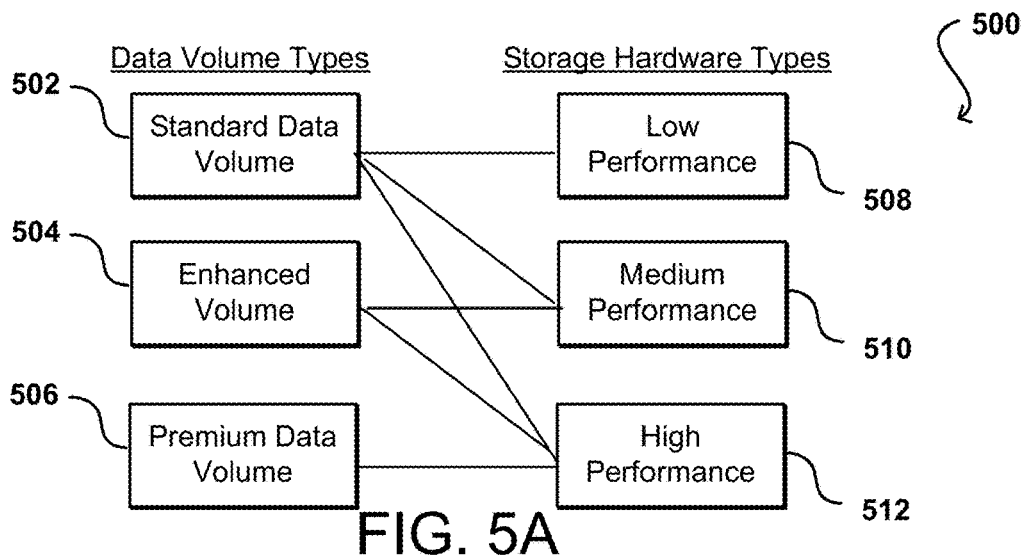
FIGS. 5A, 5B, and 5C illustrate example placement approaches that can be utilized in accordance with various embodiments.

As mentioned, there can be different types of hardware that are able to provide the desired storage capacity with at least the level of performance provided under these or other guarantees, as may correspond to a service level agreement (SLA) for a particular type or level of storage offered by a resource provider. Accordingly, storage volumes can potentially be placed on any type of hardware that is able to provide the appropriate capacity and performance. For example, FIG. 5A illustrates an example volume distribution approach 500 that can be utilized in accordance with various embodiments. In this example, there are three types of storage volumes that can be allocated to various customers. These include a standard data volume 502, an enhanced data volume 504, and a premium data volume 506. Each of these types of data volumes can come with different performance guarantees, such as may involve the amount of storage, number of IOPS, throughput, latency, etc. The storage provider utilizes three different types of storage hardware in this example, including low performance hardware 508, medium performance hardware 510, and high performance hardware 512, where each type of hardware (i.e., magnetic, optical, or SSD with different characteristics) offers different ranges of performance. As mentioned, different types of storage volumes may be able to be supported by different types of hardware. For example, a standard data volume 520 might be able to be allocated using any type of hardware, from the low performance type 508 to the high performance type 512. In some embodiments, at least a minimum amount of capacity might even be allocated for use by standard volumes. And enhanced volume 504, which has higher performance requirements than the standard volume 502, might only be capable of being supported by the medium performance 510 and high performance hardware types 512, where the low performance hardware (e.g., magnetic storage) is unable to satisfy, or at least regularly satisfy, the performance requirements of the enhanced volume. A premium data volume type 506 has the highest performance requirements, and thus may be able to be allocated using only the high performance hardware type 512.

Figure 4:
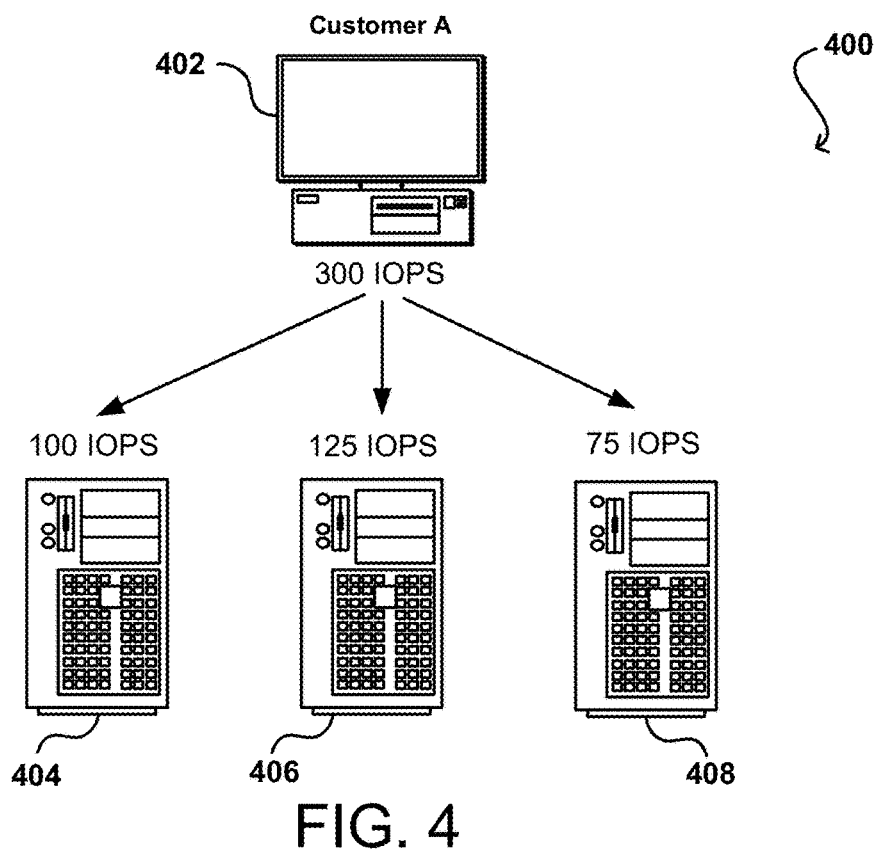
FIG. 4 illustrates an example allocation across multiple resource instances that can be used in accordance with various embodiments.

The allocation of storage, such as a number of IOPS offered to various customers, can be distributed using approaches such as those discussed with respect to FIGS. 3 and 4, using any type of hardware that supports the volume type, as illustrated in FIG. 5A. As mentioned, however, this can have various undesirable results in at least some embodiments. For example, if standard and enhanced data volumes are allocated to the high performance hardware 512 then there may not be any hardware capacity available to support a new premium data volume. In some embodiments at least some of the standard and/or enhanced data volumes may be able to be moved to lower performance hardware, but such a process requires an amount of time and thus may cause the performance (e.g., latency) for the premium data volume to fall below the guaranteed levels of the corresponding SLA.

Figure 5B:
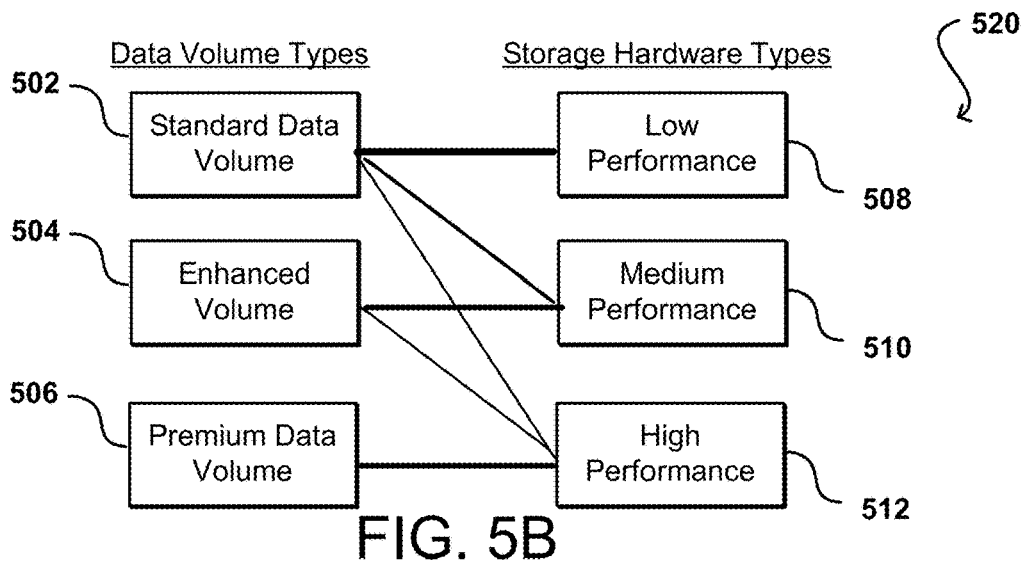

Accordingly, approaches in accordance with various embodiments can attempt to bias placement decisions to the lowest performance hardware that is able to support a type of volume. For example, FIG. 5B illustrates an example volume distribution approach 520 that utilizes performance biasing. In this illustration, thicker lines indicate relative bias for placement decisions. For example, a standard volume type 502 may be able to be placed on any type of hardware. As illustrated, however, in this embodiment the strongest bias would be to place a standard data volume 502 on low performance hardware 508, with the next highest bias to place the volume on medium performance hardware 510. In this way, standard volumes will be less likely to be placed on higher performance hardware and result in blocking higher performance requirement volumes from being stored on the higher performance hardware. In another embodiment, the bias might be stronger to place the standard data volume 502 on the low performance hardware 508, but otherwise relatively equal between the higher performance hardware types. Similarly, the enhanced volume 504 might be biased to be placed on the medium performance hardware 510 with respect to the high performance hardware 512. The premium data volume 506 is only able to be placed on high performance hardware so there is no biasing for the premium data volume. The level of the bias can be set to a specific value or adapted over time based on, for example, current workloads and performance levels. For example, a weighting value might be applied for placement decisions that favor standard volumes to be placed on low performance volumes with an 80% weighting, all other factors being the same. Standard volumes might only be placed on higher performing hardware when, for example, the lack of capacity of low performance hardware and/or excess capacity of higher performance hardware outweighs the bias to place the volume on lower performance hardware. There may also be thresholds set, such that either no standard volumes are able to be placed on higher performance hardware once the available capacity drops below a specified level, or the threshold(s) may cause the weighting or bias value to adjust such that the bias is stronger to place the volume on lower performance hardware when the available capacity of the higher performance hardware decreases.

Figure 5C:
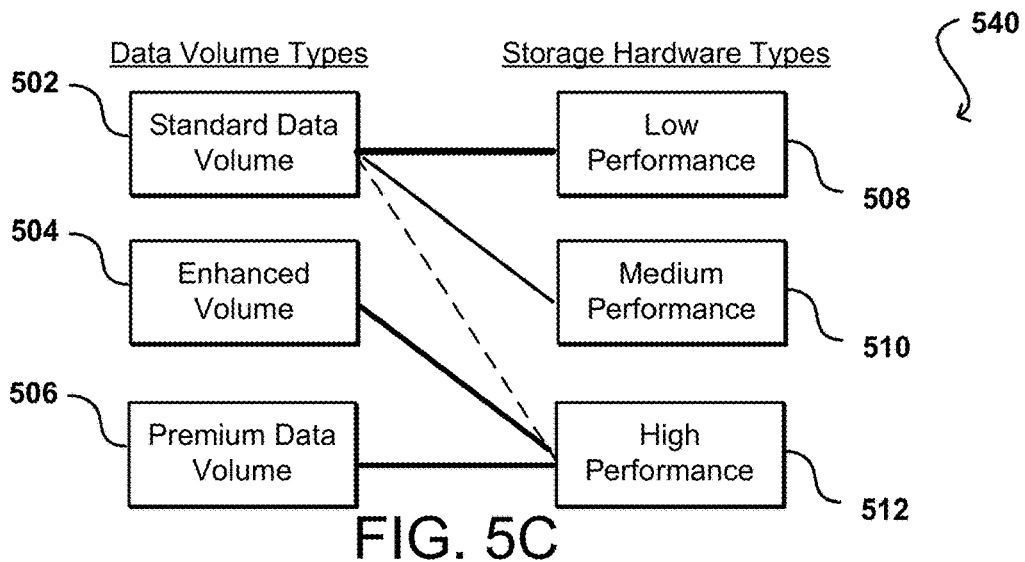

FIG. 5C illustrates an example volume distribution approach 540 that considers performance guarantees in addition to biasing. For example, based on current load or other such factors it might be the case that, for at least a period of time, the medium performance hardware 510 is unable to meet the performance requirements or SLAs for the enhanced volumes 504. Accordingly, the enhanced volumes 504 during that period of time can be placed only on the high performance hardware (capacity permitting) in order to ensure that the performance guarantees are being met. Since two types of data volumes are being supported only by the high performance hardware 512, the bias values for the standard data volume type 502 can be adjusted accordingly. For example, the bias can be such that only in rare situations will a standard data volume be placed on high performance hardware 512, such as where there is little to no available capacity on the other types of hardware. In some situations the standard data volumes might even be prevented for a certain period of time from being placed on high performance hardware, in order to enable the higher performance requirement volumes to have available capacity. The bias values can thus change dynamically with variations in workload, capacity, and performance as discussed elsewhere herein.

Further, while the examples of FIGS. 5A through 5C make placement decisions based upon levels of performance, there can be various other criteria used as discussed elsewhere herein. For example, a product might be offered to customers that not only offers a certain level of performance, but also functions in specific ways or is implemented according to specific metrics. A product available to customers might not only relate to a specific performance target or range of performance values, such as may relate to IOPS, throttling, and latency, but may also include various other criteria as may relate to cost, durability, or location. There may also be targets or criteria as may relate to a diversity in hardware, types of hardware, customer placements, geographic placement, and the like. The various criteria can also be weighted as appropriate, and these weightings can be adjusted over time. For example, some placements might be optimized for lower cost while others might be optimized for placement diversity or durability, among other such options.

As mentioned, in some embodiments each product can come with a model that has been trained or developed using historical data or target data for the various criteria. For example, a particular storage offering might come with target values for metrics such as TOPS, latency, throughput, diversity, durability, etc., or acceptable ranges for those metrics. In some embodiments each set of values for a product can correspond to a bucket or range of values for relevant criteria, which can also include weightings for the criteria. In some embodiments, a histogram can be generated for at least some of the parameters based on historical data for a type of product, and that histogram analyzed or otherwise used to determine target values and/or value ranges for the respective parameter(s). In this way, performance can also be determined by the fit of hardware with respect to the relevant model. For example, a standard volume might have a model with parameters that can be satisfied by any type of hardware, while a premium data volume might have a model with parameters that can only be met or satisfied by certain types of hardware. Thus, fit of the model or the number of types of hardware able to satisfy the model can be used in place of pure performance determinations for one or more model parameters.

Placement decisions can take any of these and other factors into account, and these factors and their relative weightings that can vary over time or with different embodiments. Example factors can include guaranteed performance levels or ranges, available hardware types, available hardware capacity, and the like. As mentioned, however, it can be undesirable in at least some embodiments to provide a varying performance level for customer volumes. Thus, even though a portion of the time a higher performance level might be able to be provided to customers, the varying performance levels may actually result in a poor customer experience. Further, even though a placement may fall outside the model parameters or bucket in a way that might seem to be beneficial to a customer, the variation and inconsistency can create a poor customer experience that leaves confusion as to what is actually supposed to be provided for a particular product or storage offering. Thus, placement decisions can also be made based upon the typical performance values or model parameter values provided for a type of volume, as well as the ability or effort in causing a particular type of hardware to perform consistently with respect to these values.

For example, a standard volume type 502 supported by low performance hardware might typically have a throughput of around 90 bits per second and around 3,000 IOPS. High performance hardware might be able to provide 300 bits per second and around 10,000 IOPS. In order to provide a consistent level of service, some amount of throttling or performance adjustment may need to be applied to the high performance hardware. The cost of managing and implementing this performance adjustment can also be taken into consideration when making placement decisions. Further, the performance can vary not only between hardware types but between hosts as well. In some embodiments the performance of each host can be monitored to not only make placement decisions, but also to determine an amount of performance adjustment to be applied for each host. The values can be varied as appropriate to ensure a consistent performance both at instance launch and during normal customer workloads.

In one example, a varying amount of throttling can be applied to obtain latency within a target range for a standard data volume placed on SSD hardware. The latency values for SSD hardware may be much lower than are typically provided for standard volumes. A default difference can be used to set an initial level of throttling, and the actual performance monitored to make adjustments to keep the actual performance within the target range for the standard data volume. In some embodiments the latency can be measured for each read or write operation, while in other embodiments the latency can be measured at regular intervals, for a subset of I/O operations, for random operations, etc. The throttling of IOPS for a standard volume on SSD hardware, for example, allow allows a greater number of IOPS to be available on the SSD hardware for higher performance requirement data volumes. In some embodiments the read and write paths can be different, and experience different levels of performance, such that different performance adjustments might need to be made for each path, and the performance values for both paths can be considered when making placement decisions. In some embodiments histogram values can be generated to determine maximum, minimum, mean, average, and/or other values that can be used to determine the relevant performance values or ranges for a particular host, storage volume, volume type, etc. In some embodiments this information can be surfaced through a management console, which can allow for range settings and updates, among other such options.

Different types of operations can also potentially benefit from being placed on specific types of hardware. For example, during an operating system boot there may be a large number of smaller block reads. This may benefit from magnetic hardware, for example, where the small operations can be cached for storage. The latency for such operations thus can be very low even for magnetic hardware, and can be less than would be experienced for similar operations using at least some solid state hardware. In order to cause the performance levels to be maintained, latency may be injected even for standard hardware types that would normally support that type of data. In some embodiments there can be a configuration file for different volumes, hosts, fleets, or other values that can include a value specifying an amount of latency adjustment to be applied, and that amount can be adjusted dynamically as appropriate in at least some embodiments in response to monitoring the actual latency observed, particularly with respect to a target or latency range for a type of volume or product offering.

Customers of a storage provider in some embodiments can purchase an experience or level of performance, or a product offering the same, versus a portion of a server as in conventional approaches. A set of capacity dimensions and other parameters or requirements can be defined, and customers can purchase types of volumes based on the values for the various capacity dimensions. In some embodiments a customer may not be limited to specific types of volumes, but may instead be able to specify the values for the performance or capacity dimensions and obtain storage volumes that perform at those values, and can be charged accordingly. For example, in addition to a minimum amount of storage each customer can purchase a committed rate of operations, such as a specific rate of input/output (I/O) operations. Embodiments discussed herein can allow customers to purchase performance guarantees at any appropriate level of granularity. By managing the performance allocations for customers on various resources, systems and methods in accordance with various embodiments can enable customers to purchase volumes that have an IOPS guarantee at any appropriate level, for example, such as between 1 IOPS and 5,000 IOPS.

In some embodiments, the committed rate might be allocated up to 100% of the capacity of a server. An amount of un-committed usage can be predicted and/or monitored, such that a number of customers can be allocated to resources that are fully committed, as long as the customer is willing to take resources only as they come available. Certain customers might not care when IOPS occur, particularly for certain writes, such that they would be willing to pay a lower rate to utilize resources that are guaranteed up to 100%, knowing that some customers likely will not utilize their full guaranteed levels. Such an approach assists the provider in maximizing the utilization of each resource by allocating un-committed IOPS on resources that are otherwise "fully" committed.

In order to make commitments on a new resource (or new instance of a resource), certain default information can be used to make commitments. It can be desirable to use relatively conservative numbers as the defaults, in order to prevent over-committing a resource. For example, a control plane component can use general default information that each spindle of a particular type can handle 100-120 IOPS. If there are twelve spindles per server, there can be about 1200-1440 IOPS available per server. The control plane components can be conservative, initially, and can allocate a first amount, such as up to 400 IOPS, until more information is gained about the performance and usage of that resource. In certain examples customer utilization is about 10%, such that in many instances customers are using only 10% of the available IOPS. Thus, dedicating 40% to guaranteed IOPS would still be four times more than is actually being used, and thus likely is still a conservative number. Each server in the data plane can track the amount of available space on the server, and can store the number of IOPS that are committed for that server. Thus, when a new volume is to be created, the control plane components can determine a server that, out of that 400 IOPS, has enough capacity available that the server is willing to commit for that volume. An approach in one embodiment is to ask servers, at random or in a particular order, whether they can take a specific number of IOPS, and this continues until a server is located that can accept the IOPS. When the information is also stored in the control plane, however, the control plane can select an appropriate server first and then contact that server to take the volume.

In many situations, however, a user will not utilize the throughput (or other functional aspects) provided by a guarantee such as those described above. The user might have a guaranteed available rate of I/O operations provided by three different servers, but during normal use might only use a rate of operations that could be provided by one of those servers, or a portion of each server. In such an example, the user might prefer not to have to pay for the guarantees, or dedicated rate of I/O operations, at all times. The user might be willing to instead pay for a certain amount of dedicated capacity, such as a dedicated rate of 125 IOPS that are always dedicated to the user. For the other 175 IOPS that the user only uses occasionally, however, the user might be willing to reserve capacity that can enable other users to utilize that capacity while the capacity is not being used, in order to help spread the cost of the capacity to those other users. In other cases, the user might want to only pay for those requests that exceed the dedicated (or reserved) capacity. Thus, the user might prefer to get priority for those requests over requests from average users, but might not want to be charged for more capacity than is actually being used. The user in many embodiments can achieve this by submitting a bid price along with the request, which will cause that request to receive priority treatment if that bid exceeds the current market price and/or exceeds any other pending bid for the same type of capacity. Such a process can be complex for a large number of users with different types of requests and requirements.

Figure 6:
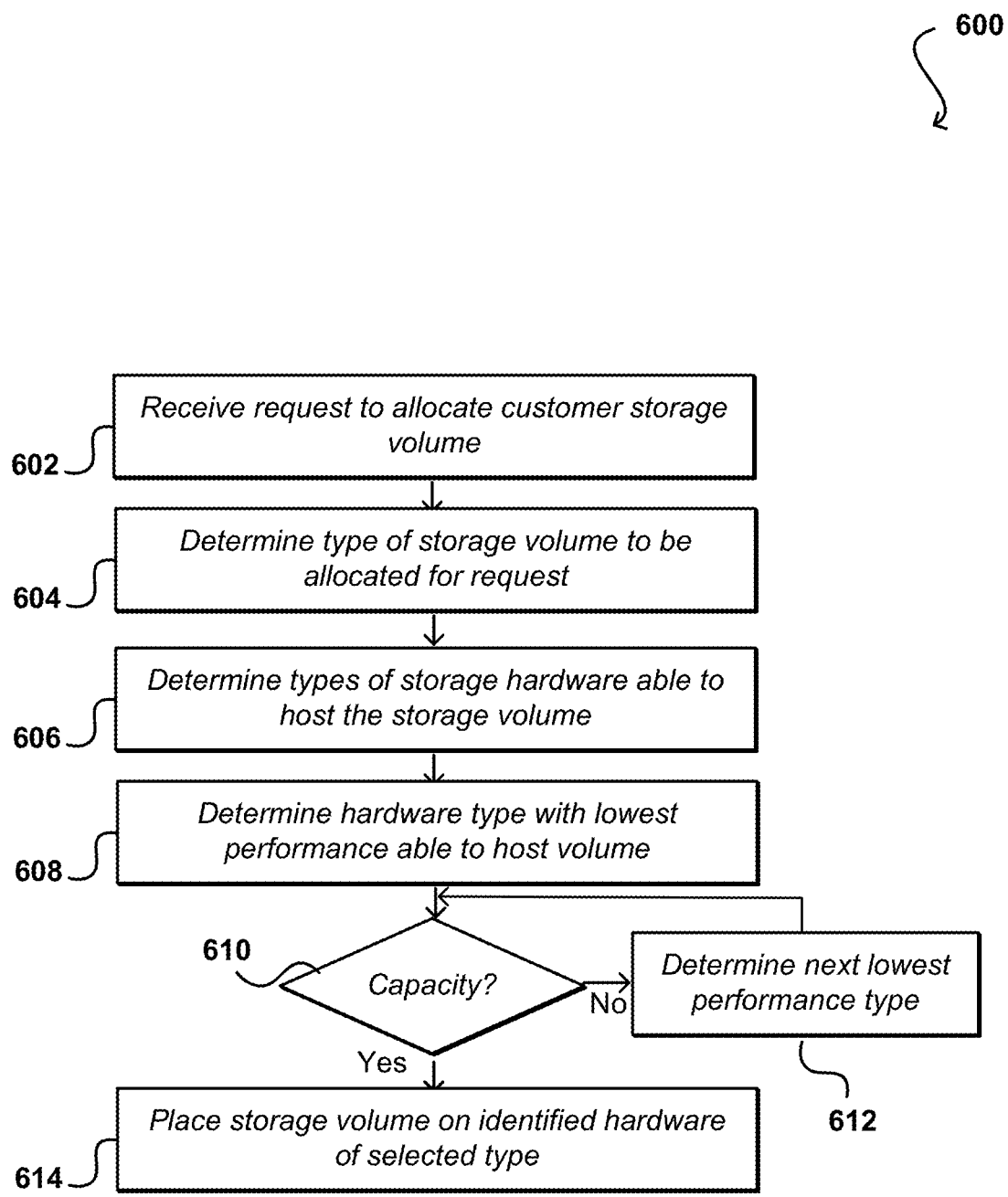
FIG. 6 illustrates an example process for biasing placement of storage volumes to particular hardware types that can be utilized in accordance with various embodiments.

FIG. 6 illustrates an example process 600 for biasing the placement of a data storage volume that can be utilized in accordance with various embodiments. It should be understood for the various processes described herein, however, that additional, fewer, or alternative steps can be performed in similar or alternative orders, or in parallel, within the scope of the various embodiments unless otherwise stated. In this example, a request to allocate a storage volume on behalf of a customer is received 602, such as to a placement or storage manager of a resource provider environment. The request can be a request for a new storage volume, or a request to perform a data operation that will require the allocation of a new storage volume, among other such options. The request can also come from a user device or management service of the resource provider environment, among other such options.

In order to allocate an appropriate storage volume, a type of storage volume to be allocated for the request can be determined 602. The determination can be based upon a number of different factors, such as a type of customer account associated with the volume, an intended use for the volume, an application associated with the volume, etc. In some embodiments there will be a set of possible volume types, and a customer can select a specific type to be allocated. The type of volume to be allocated can then be determined 604 as part of the process. In this example, there are also different types of hardware in the resource provider environment that are capable of hosting storage volumes, and each type can have different performance capabilities. As part of the process, a determination can be made 606 as to the type(s) of hardware that are able to host a storage volume of the determined type. As mentioned, lower requirement volumes might be able to be hosted by each type, while higher requirement volumes might be able to be hosted (with the performance requirements met) by only a subset of the types of hardware, or even a specific hardware type. In this example, the placement decision will be to bias the placement of a volume towards the lowest performance hardware that is able to host the volume. Thus, the hardware type (or even specific host) with the lowest performance characteristics that is able to host the volume can be determined 608. The determination can be for a specific characteristic, group of characteristics, or weighted combination of characteristics, among other such options. A determination can be made 610 as to whether a host or resource of that type (or a specific host) has available capacity to host the storage volume. As discussed, this can be an actual capacity, anticipated capacity, or minimum amount of capacity, among other such options. If not, the type of host or hardware with the next lowest performance can be determined 612 and the process repeated until sufficient capacity is found or it is determined that there is insufficient capacity to host the new volume, at which point the request can be denied. Once sufficient capacity is located, the storage volume can be placed 614 on the identified hardware of the selected type that is able to at least satisfy the performance requirements for the storage volume.

While the process 600 of FIG. 6 provides a useful example, it should be understood that various other criteria can be used for making placement decisions as discussed herein. For example, the customer could have purchased a storage product or offering that has a corresponding model with targets or ranges of various model parameters, as may relate to performance, availability, durability, diversity, or other types of parameters discussed and suggested elsewhere herein. The process can then determine which types of hardware can satisfy the model, and in some embodiments can determine a best fit for the model. The best fit can be determined based upon closeness of the hardware values to those of the model, but can also be biased towards one or more specific values. For example, the best fit for a model might be one that meets the model values but has the lowest cost or can be provided by the largest number of types of hardware. The best fit might alternatively be one that meets other criteria, such as greatest diversity or most capacity, among other such options. In some embodiments a placement function can look at a weighted combination of these values and come up with a fit ranking that addressed the intended bias accordingly.

Figure 7:
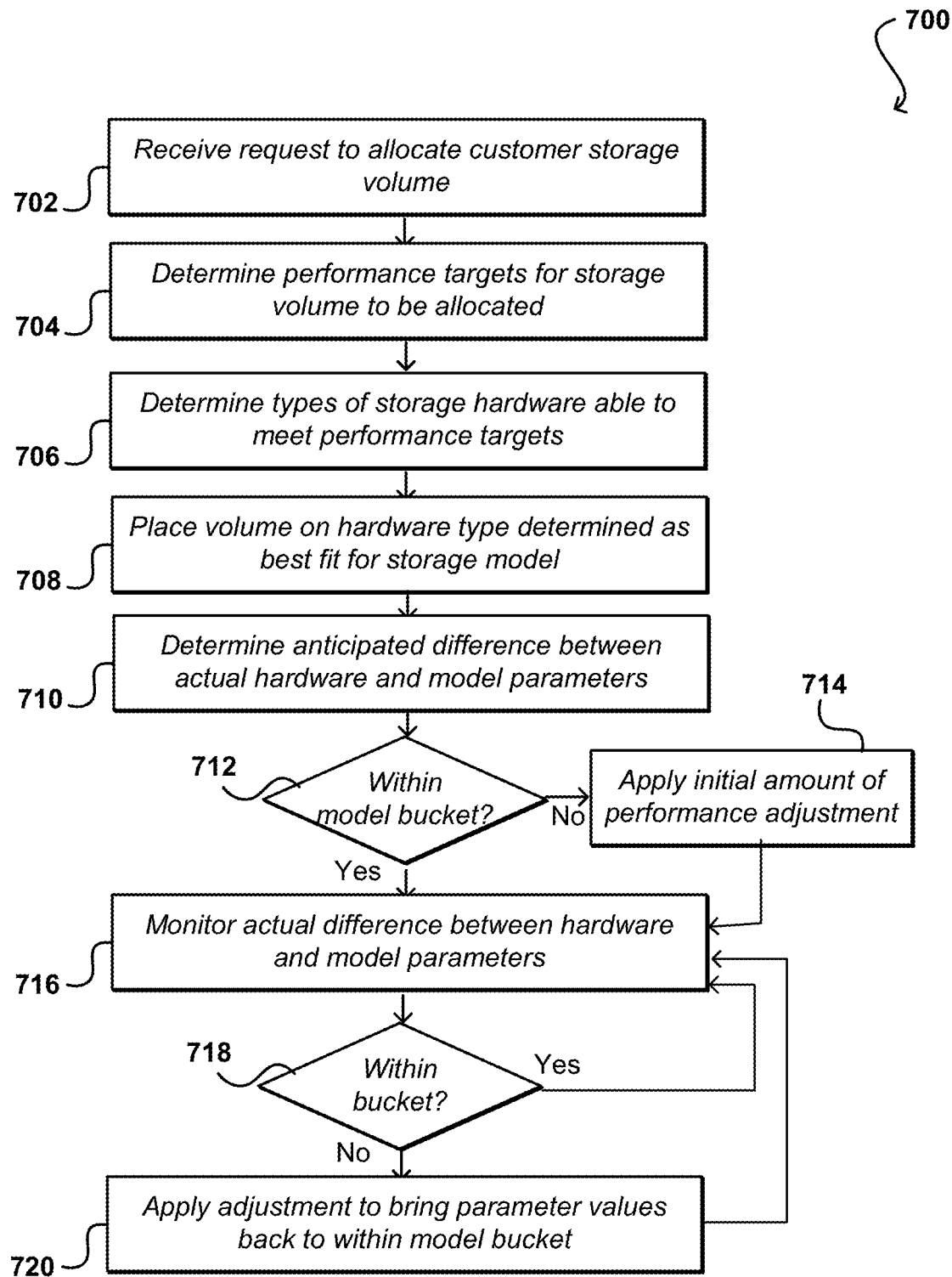
FIG. 7 illustrates an example process for providing a consistent level of performance for a storage volume that can be utilized in accordance with various embodiments.

As mentioned, however, in some embodiments it is desirable to provide a consistent performance regardless of the type of hardware used to host a volume. In such an embodiment the performance of a storage volume should not change appreciably if moved or placed onto different types of hardware. Accordingly, FIG. 7 illustrates an example process 700 for providing a data volume that meets one or more specified criteria that can be utilized in accordance with various embodiments. In this example, a request to allocate a customer storage volume is received 702 as discussed previously. In this example, however, one or more performance targets are determined 704 for the storage volume to be allocated. These can include specific targets identified by a user, or targets determined as part of a product or offering from a service provider, among other such options. The targets may also be specific values, ranges of values, buckets of potential values, or targets corresponding to various histograms or models, among other such options. Once the targets or criteria are identified, one or more types of storage hardware are determined 706 that are able to meet or satisfy those targets, as may correspond to an identified model including the parameters for those targets as discussed elsewhere herein. This can include, for example, hardware that is able to meet performance requirements or at least satisfy model criteria or parameters. In some embodiments there may be several different criteria, and hardware can be identified that satisfy all or at least some of the different criteria, and at least some level of ranking or fit can be determined based upon the appropriateness for the various target parameters, as may be modified by any weightings or other adjustments. Once identified, the storage volume can be placed 708 on a hardware type that is determined to be a "best fit" for the corresponding model or parameters. In at least some embodiments, a volume can be spread across a number of partitions that may be hosted on a variety of different hardware types. Thus, the model takes into account partitions hosted on servers with different performance capabilities. For performance targets, this can include hardware that is able to meet the performance targets. For volume type models, this can include a type of hardware that is determined to most closely match or correspond to the model parameters, biased according to any specified weighting or specified value. The determination of which hardware to host the storage volume can be made using any relevant process discussed elsewhere herein, such as is discussed with respect to the process of FIG. 6.

In this example, the anticipated performance and other criteria values for the hardware can be determined, such as may be based upon historical performance of that hardware with respect to that type of volume under a current workload level. Any differences between the anticipated values and the performance targets, or model parameter values, can be determined 710. If it is determined 712 that the differences are within the model bucket, variation allowances, or allowable tolerances, such as within an allowable range of amount of deviation from a target value, then the volume can be allowed to process I/O requests. If not, an initial amount of adjustment, such as IOPS or latency throttling, can be determined and applied 714 based on the determined differences, to attempt to satisfy the performance targets or model parameters for the volume. For example, if a type of volume is to receive 100 IOPS but the current hardware can provide 400 IOPS, the volume can be throttled such that the actual performance for the volume is around 400 IOPS. As mentioned, the performance can be increased as well in some embodiments if the performance is below a target value and the hardware is capable of such an increase. Alternatively the volume can be moved to another hardware type, etc. During operation, the actual values for the storage volume can be monitored 716, with values being calculated for some or all of the I/O for the storage volume. Another determination can be made 718, either continually, at regular intervals, in response to a calculation, or at any other relevant time, as to whether the storage volume values are within the appropriate parameter bucket of the model for the type of volume. If so, the volume can continue processing I/O. If not, the type and/or amount of adjustment can be updated and applied 720, up or down, to attempt to bring the values of the volume back to within the appropriate model parameters. If the adjustment is not able to be adjusted to reach the model parameters on the current host, or if the variation is too erratic, then the storage volume can be moved to a different host or type of hardware.

It should be understood that even though examples discussed herein refer to a program execution service and resource performance, the described techniques can be used to manage access to various types of computing-related resources discussed herein, and can process requests not related to a user-specific program or application. A non-exclusive list of examples of types of computing-related resources and resource capacity that may be managed for use by multiple users includes the following: persistent data storage capabilities (e.g., on non-volatile memory devices, such as hard disk drives); temporary data storage capabilities (e.g., on volatile memory, such as RAM); message queuing and/or parsing capabilities; other types of communication capabilities (e.g., network sockets, virtual communication circuits, etc.); database management capabilities; dedicated bandwidth or other network-related resources; guaranteed rates of IOPS; maximum latency guarantees; input device capabilities; output device capabilities; processor (e.g., CPU) cycles or other instruction execution capabilities; etc. In one example, a user may request one or more indicated types of computing-related resource capacity, and the PES system can automatically determine an amount of each indicated type of resource capacity (e.g., based on an explicit quantity or other amount indicated by the user in the request, based on predetermined amounts associated with particular resource types, based on available amounts of the indicated resource types, etc.) to provide for the user, such as a first amount of volatile memory and a second amount of minimum bandwidth.

Figure 8A:
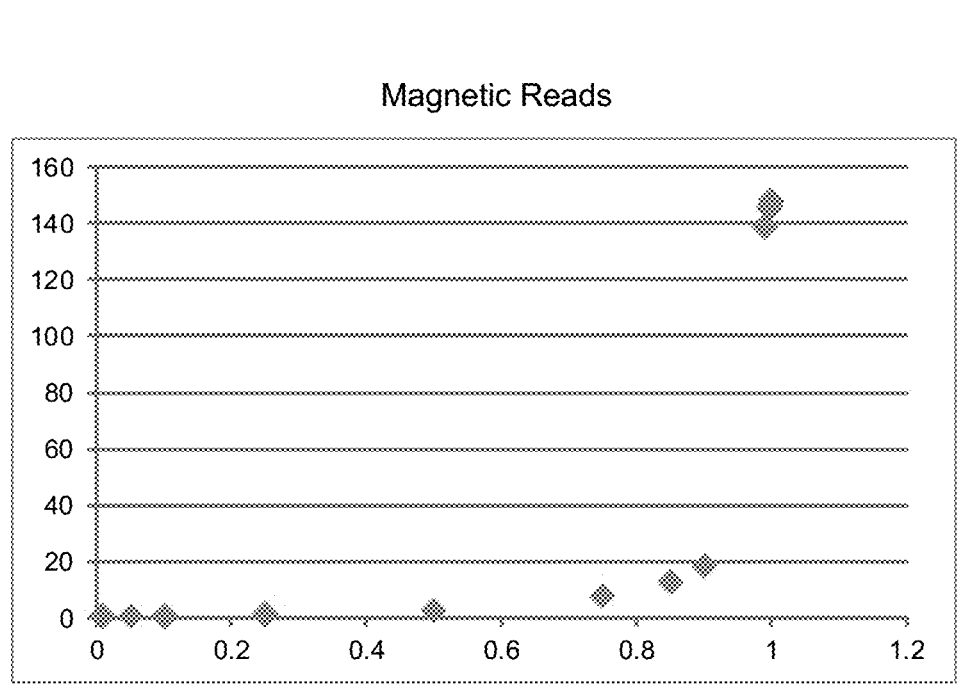
FIGS. 8A and 8B illustrate example parameter histograms that can be utilized in accordance with various embodiments.
Figure 8B:
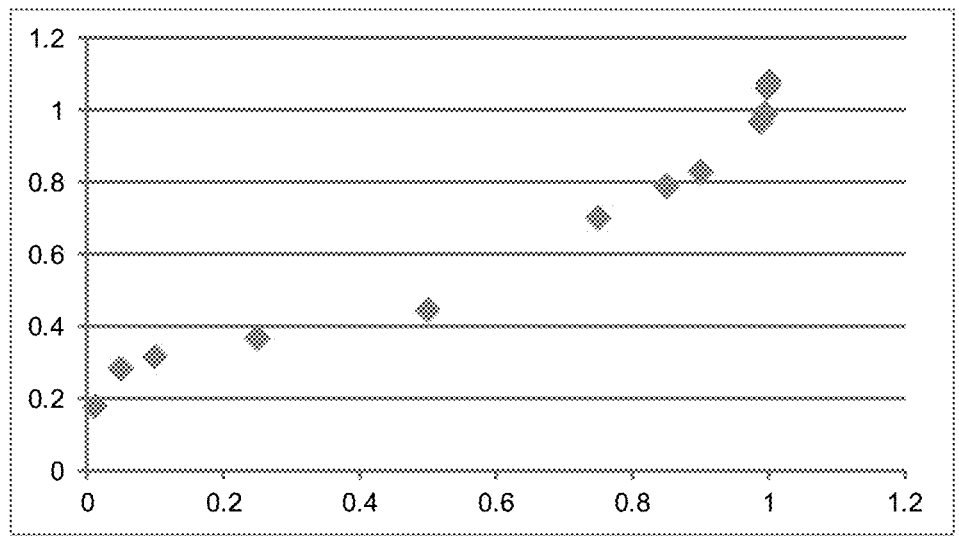

FIGS. 8A and 8B illustrate example histograms that can be used to generate a model for different volume types that can be utilized in accordance with various embodiments. In this example, the first histogram 800 reflects historical data for read events on magnetic hardware, and the second histogram 850 reflects historical data for read events for a premium volume. The x-axis values correspond to percentiles, while the y-axis values refer to the latencies in milliseconds. Using such an approach, a model can be built using information such as the read latencies for magnetic reads 90% of the time should be about 20 milliseconds, and for premium volumes should be less than 1 millisecond. Accordingly, the model parameter values can be set such that if a standard volume that would normally be hosted on magnetic hardware is placed on hardware that normally supports a premium volume, then the hardware may need to be throttled to bring the latency down from under one millisecond to about twenty milliseconds. In some embodiments these latency targets can be a requirement, while in others they may be part of a multi-parameter model and it is desired to come as close to the set of target parameters as possible, with some parameters possibly being weighted or prioritized higher than others. Different types of products may have different priorities with respect to placement as well, as even though a placement of one product might be a better fit from a model perspective there might be fewer types of hardware able to support a specific type of product such that the specific type of product has priority of placement, even if it falls outside the model. If a type falls too far outside the model then the volume can be moved or placed on other hardware, or type of hardware. In addition to placement decisions, the histograms can be used to tune the performance as well. For example, a currently latency value can be calculated and compared to the histogram. If it is determined that the current latency is only experienced by the target volume type less than 20% of the time then an appropriate adjustment in performance or placement can be initiated to attempt to bring back to a determined target, such as a value that would be experienced by the type of value at least 80% of the time.

Figure 9:
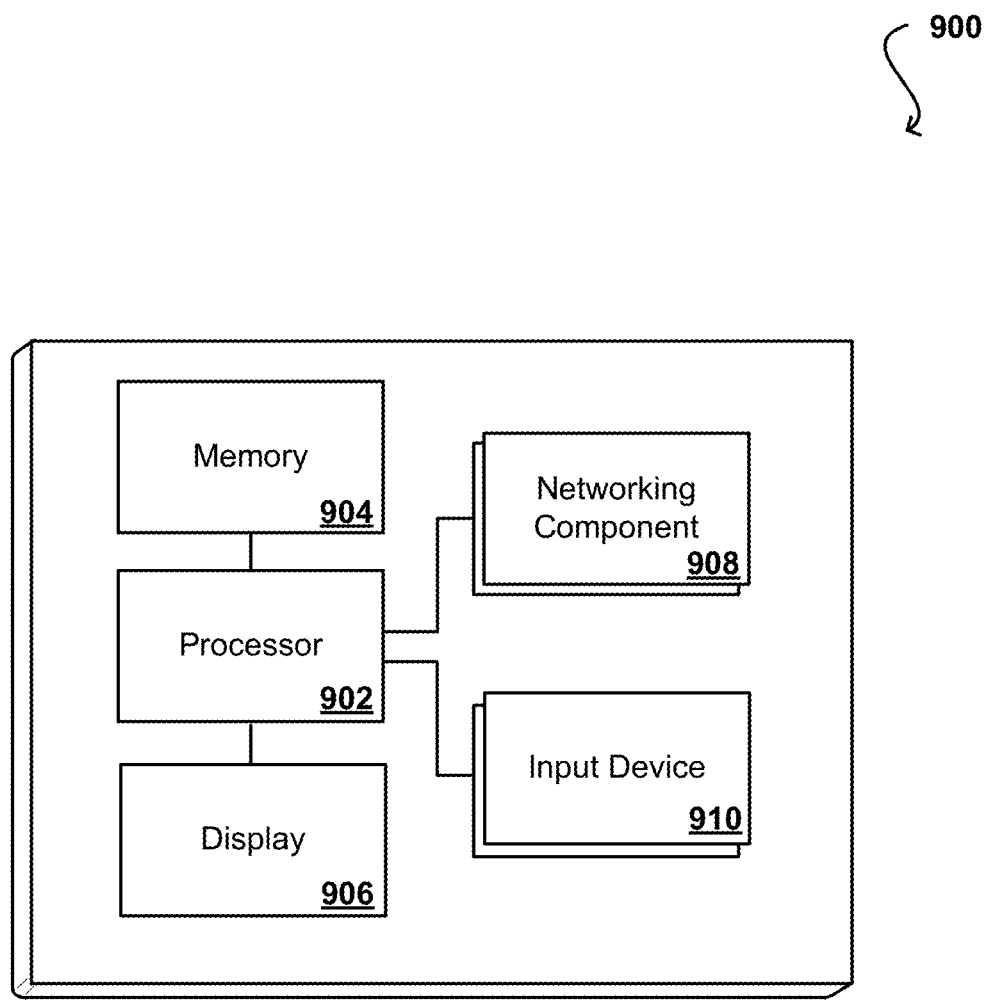
FIG. 9 illustrates components of an example computing device that can be utilized to perform aspects of the various embodiments.

FIG. 9 illustrates a set of basic components of an example computing device 900 that can be utilized to implement aspects of the various embodiments. In this example, the device includes at least one processor 902 for executing instructions that can be stored in a memory device or element 904. As would be apparent to one of ordinary skill in the art, the device can include many types of memory, data storage or computer-readable media, such as a first data storage for program instructions for execution by the at least one processor 902, the same or separate storage can be used for images or data, a removable memory can be available for sharing information with other devices, and any number of communication approaches can be available for sharing with other devices. The device may include at least one type of display element 906, such as a touch screen, electronic ink (e-ink), organic light emitting diode (OLED) or liquid crystal display (LCD), although devices such as servers might convey information via other means, such as through a system of lights and data transmissions. The device typically will include one or more networking components 908, such as a port, network interface card, or wireless transceiver that enables communication over at least one network. The device can include at least one input device 910 able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

As discussed, different approaches can be implemented in various environments in accordance with the described embodiments. As will be appreciated, although a Web-based environment is used for purposes of explanation in several examples presented herein, different environments may be used, as appropriate, to implement various embodiments. The system includes an electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request to allocate a data storage volume in a shared resource environment;
   determining a type of the data storage volume to allocate for the request;
   determining a volume model for the type of the data storage volume, the volume model specifying a set of acceptable values for a set of volume parameters;
   determining two or more types of hardware capable of providing the type of the data storage volume according to the volume model;
   determining, for each type of the two or more types of hardware, a fit to the volume model;
   determining a selected type of hardware on which to place the data storage volume, the selected type of hardware being selected based at least in part upon an available storage capacity of the selected type of hardware and the fit;
   placing the data storage volume on a selected host of the shared resource environment, the selected host having the selected type of hardware; enabling the data storage volume to process data operations on behalf of a customer associated with the request;
   determining an anticipated value for at least one volume parameter for at least a portion of the data storage volume hosted on the selected host; and
   adjusting operation of the data storage volume, including throttling of the data operations sent to the data storage volume based at least in part on a diversity of service levels and hardware types for the shared resource environment, in response to the anticipated value exceeding a variable threshold amount from the volume model, to correspond the data storage volume to the volume model.

2. The computer-implemented method of claim 1, further comprising:
   determining the fit of one of the types of hardware to the volume model by comparing the anticipated values of the type of hardware to the set of acceptable values, the comparing capable of accounting for at least one of a weighting or a biasing of one or more of the set of volume parameters.

3. The computer-implemented method of claim 1, further comprising:
   adjusting at least a placement of the data storage volume if a value of the set of volume parameters falls outside the set of acceptable values for the volume model.

4. The computer-implemented method of claim 1, further comprising:
   obtaining past performance data for a selected type of hardware;
   generating a histogram for at least one of the set of volume parameters based at least in part upon the past performance data; and
   generating the volume model for the selected type of hardware based at least in part upon the histogram.

5. A computer-implemented method, comprising:
   determining a target value for at least one parameter of a data storage volume to be hosted in a shared resource environment;
   determining a set of hosts having available capacity and capable of achieving the target value for the data storage volume, the set of hosts including at least two different types of hardware;
   determining a selected host, from the set of hosts, to host at least a portion of the data storage volume;
   determining an anticipated value for the at least one parameter for the at least a portion of the data storage volume hosted on the selected host;
   enabling data operations to be performed with respect to the data storage volume; and
   adjusting operation of the data storage volume, including throttling of the data operations sent to the data storage volume based at least in part on a diversity of service levels and hardware types for the shared resource environment, in response to the anticipated value exceeding a variable threshold amount from the target value, to correspond the data storage volume to the target value.

6. The computer-implemented method of claim 5, further comprising:
monitoring the operation of the data storage volume; and
adjusting the operation to cause an operational value for the data storage volume to not deviate more than the threshold amount from the target value.

7. The computer-implemented method of claim 6, further comprising:
determining that the operational value deviates more than the threshold amount from the target value; and
moving the data storage volume to a different host in the shared resource environment.

8. The computer-implemented method of claim 5, further comprising:
determining a number of types of data storage volumes able to be supported by each of the at least two different types of hardware; and
biasing determination of the selected host towards lower numbers of types of data storage volumes able to be supported.

9. The computer-implemented method of claim 8, further comprising:
determining the number of types of data storage volumes based upon at least one of a specified parameter, an average normalized value of a set of parameters, or a weighted combination of values of the set of parameters.

10. The computer-implemented method of claim 5, wherein the at least one parameter includes at least one of input/output operations per second (IOPS), throughput, compute capacity, storage capacity, bandwidth, latency, resource diversity, durability, geographic location, or geographic diversity.

11. The computer-implemented method of claim 5, wherein the at least two different types of hardware include at least one of magnetic storage, optical storage, or solid state storage.

12. The computer-implemented method of claim 5, further comprising:
providing at least a subset of the set of hosts using a block-based storage system.

13. The computer-implemented method of claim 5, further comprising:
setting at least one of a minimum amount or a maximum amount of storage capacity to be allocated for a type of data storage volume on the at least two different types of hardware.

14. The computer-implemented method of claim 5, further comprising:
determining at least one anticipated value of an anticipated capacity, an anticipated health, an anticipated fragmentation, or an anticipated workload for the set of hosts, wherein the selected host is determined based at least in part upon the at least one anticipated value.

15. A system, comprising:
at least one processor; and
memory including instructions that, when executed by the at least one processor, cause the system to:
determine a target value for at least one parameter of a data storage volume to be hosted in a shared resource environment;
determine a set of hosts having available capacity and capable of achieving the target value for the data storage volume, the set of hosts including at least two different types of hardware;
determine a selected host, from the set of hosts, to host at least a portion of the data storage volume;
determine an anticipated value for the at least one parameter for the at least a portion of the data storage volume hosted on the selected host;
enable data operations to be performed with respect to the data storage volume; and
adjust operation of the data storage volume, including throttling of the data operations sent to the data storage volume based at least in part on a diversity of service levels and hardware types for the shared resource environment, in response to the anticipated value exceeding a variable threshold amount from the target value, to correspond the data storage volume to the target value.

16. The system of claim 15, wherein the instructions when executed further cause the system to:
monitor the operation of the data storage volume; and
adjust the operation to cause an operational value for the data storage volume to not deviate more than the threshold amount from the target value.

17. The system of claim 16, wherein the instructions when executed further cause the system to:
determine that the operational value deviates more than the threshold amount from the target value; and
move the data storage volume to a different host in the shared resource environment.

18. The system of claim 15, wherein the instructions when executed further cause the system to:
determine a number of types of data storage volumes able to be supported by each of the at least two different types of hardware; and
bias determination of the selected host towards lower numbers of types of data storage volumes able to be supported.

19. The system of claim 15, wherein the at least one performance parameter includes at least one of input/output operations per second (IOPS), throughput, compute capacity, storage capacity, bandwidth, latency, resource diversity, durability, geographic location, or geographic diversity.

* * * * *